United States Patent
Lee et al.

(10) Patent No.: US 9,729,269 B2
(45) Date of Patent: Aug. 8, 2017

(54) WIRELESS COMMUNICATION SYSTEM INCLUDING COMMUNICATION APPARATUS AND DATA COMMUNICATION METHOD THEREOF

(71) Applicant: SAMSUNG ELECTRONICS CO., LTD., Suwon-si (KR)

(72) Inventors: Tae-young Lee, Seoul (KR); Jae-eun Kang, Anyang-si (KR); Myoung-hwan Lee, Suwon-si (KR); Kyung-ik Cho, Seoul (KR); Sung-chul Park, Suwon-si (KR); Chil-youl Yang, Seoul (KR); Scott Seongwook Lee, Suwon-si (KR); Jin Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 414 days.

(21) Appl. No.: 14/060,929

(22) Filed: Oct. 23, 2013

(65) Prior Publication Data

US 2014/0112121 A1    Apr. 24, 2014

Related U.S. Application Data

(60) Provisional application No. 61/717,251, filed on Oct. 23, 2012.

(30) Foreign Application Priority Data

Jan. 22, 2013    (KR) ........................ 10-2013-0007174

(51) Int. Cl.
H04L 1/00    (2006.01)

(52) U.S. Cl.
CPC .......... *H04L 1/0003* (2013.01); *H04L 1/0009* (2013.01)

(58) Field of Classification Search
CPC ........................... H04L 1/0003; H04L 1/0009
(Continued)

(56) References Cited

U.S. PATENT DOCUMENTS 7,336,634 B2    2/2008   Del Prado et al.
7,792,138 B2    9/2010   Hahm et al.
(Continued)

FOREIGN PATENT DOCUMENTS

KR    10-2010-0138692 A    12/2010

OTHER PUBLICATIONS

Wong, et al., "Robust Rate Adaption for 802.11 Wireless Networks", MobiCom '06, Sep. 23-26, 2006, pp. 146-157.
(Continued)

*Primary Examiner* — Ricky Ngo
*Assistant Examiner* — Richard Chang
(74) *Attorney, Agent, or Firm* — Sughrue Mion, PLLC

(57) ABSTRACT

A data transmission method is provided, including adjusting a data transmission speed when a number of retransmission of a data transmission unit reaches a predetermined number, wherein the retransmission is performed when a transmission failure occurs, transferring the data transmission unit at the adjusted data transmission speed, and readjusting the adjusted data transmission speed to a basic data transmission speed when data transmission is successful, and reducing the basic data transmission speed when at least one of a retransmission rate and a number of the transmission failure satisfies a predetermined threshold condition.

10 Claims, 9 Drawing Sheets

(58) Field of Classification Search
USPC .......................................................... 370/216
See application file for complete search history.

(56) References Cited

U.S. PATENT DOCUMENTS

| | | |
|---|---|---|
| 2002/0068560 A1 | 6/2002 | Agin |
| 2010/0097924 A1* | 4/2010 | Yamaguchi ........... H04L 1/0009 370/216 |
| 2010/0169723 A1 | 7/2010 | Baldo et al. |
| 2010/0284454 A1 | 11/2010 | Oteri et al. |
| 2012/0063439 A1 | 3/2012 | Seok |
| 2013/0028088 A1* | 1/2013 | Do ........................ H04L 1/0002 370/235 |

OTHER PUBLICATIONS

Kamerman, et al., "WaveLAN-II: A High-Performance Wireless LAN for the Unlicensed Band", Bell Labs Technical Journal, 1997, pp. 118-133.

Lacage, et al., "IEEE 802.114 Rate Adaption: A Practical Approach", MsWiM '04, Oct. 4-6, 2004, 9 pgs. total.

John C. Bicket, "Bit-rate Selection in Wireless Networks", Massachusetts Institute of Technology, Feb. 2005, 50 pgs. total.

Qiao, et al., "Goodput Analysis and Link Adaption for IEEE 802.11a Wireless LANs", IEEE Transactions on Mobile Computing, vol. 1, No. 4, Oct.-Dec. 2002, pp. 278-292.

* cited by examiner

| Frame Control | Duration/ID | Address 1 | Address 2 | Address 3 | Sequence Control | Address 4 | Frame Body | FCS |

(2)

| Frame Control | Duration | Address | FCS |

FIG. 3

| Long-term LA MCS | Short-term LA level 1 | Short-term LA level 2 | Short-term LA level 3 |
|---|---|---|---|
| | Retry count 0 | Retry count 3 | Retry count 5 |
| MCS 12 | MCS 12 | MCS 11 | MCS 10 |

FIG. 8

| AID | Long-term LA MCS | Short-term LA level 1 | Short-term LA level 2 | Short-term LA level 3 |
|---|---|---|---|---|
| | | Retry count 0 | Retry count 3 | Retry count 5 |
| 1 | MCS 12 | MCS 12 | MCS 11 | MCS 10 |
| 2 | MCS 11 | MCS 11 | MCS 10 | MCS 8 |
| 3 | MCS 12 | MCS 12 | MCS 11 | MCS 8 |

WIRELESS COMMUNICATION SYSTEM INCLUDING COMMUNICATION APPARATUS AND DATA COMMUNICATION METHOD THEREOF

CROSS-REFERENCE TO RELATED APPLICATIONS

This application claims priority from U.S. Provisional Patent Application No. 61/717,251, filed on Oct. 23, 2012, in the United States Patent and Trademark Office, and Korean Patent Application No. 10-2013-0007174, filed on Jan. 22, 2013, in the Korean Intellectual Property Office, the disclosures of which are incorporated herein by reference in their entireties.

BACKGROUND

Field

Apparatuses and methods consistent with exemplary embodiments relate to a wireless communication system including a communication apparatus and a data communication method thereof, and more particularly, to a wireless communication system including a communication apparatus which communicates using a link adaptation method and a data communication method thereof.

Description of the Related Art

Recently, along with development of information and communication technologies, various wireless communication technologies have been developed. Among them, a wireless local area network (WLAN) is a technology for wirelessly accessing the Internet wirelessly using portable terminal devices, such as smart phones, tablet personal computers (PCs), laptop computers, and portable multimedia players located within a predetermined distance from an access point (AP).

Institute of Electrical and Electronics Engineers (IEEE) provides various standards regarding WLAN technology. A recent technology standard use model includes IEEE 802.11n, which has the maximum transmission speed of 600 Mbps. In addition, an initial radio wave arrival distance of 10 m or less is now increased to 50 m to 200 m More specifically, IEEE 802.11n adds a frame integration technology of a Multiple Input and Multiple Output (MIMO), a physical layer having a channel bandwidth of 40 MHz, and a media access layer (MAC) layer to 802.11 standards.

However, a higher bit transmission speed can transfer more data during a unit time period but provide a lower throughput at a loss link. In general, a lower bit transmission speed has a lower loss possibility. Communication systems require data transmission to be efficient and at an appropriate transmission speed. One of efficient data transmission methods is link adaptation. Link adaptation is a process of increasing a data throughput at a highest possible transmission speed using a particular modulation and coding scheme in a given link quality.

The link adaptation method includes an AutoRate Fallback (ARF) scheme, and a Receiver Based Auto Rate (RBAR) scheme based on Request-To-Send/Clear-To-Send (RTS/CTS). However, the ARF scheme is heuristic and cannot deal with quickly changing wireless channel conditions. The RBAR scheme adds a lot of changes to the IEEE 802.11 standards and consumes a large amount of wireless resources. Therefore, there is a need for technologies providing effective data transmission while being capable of promptly dealing with an instant change in a channel.

SUMMARY

Exemplary embodiments overcome the above disadvantages and other disadvantages not described above. Also, exemplary embodiments are not required to overcome the disadvantages described above, and an exemplary embodiment may not overcome any of the problems described above.

Exemplary embodiments provide a wireless communication system including a communication apparatus which adopts a link adaptation method in which long-term link adaptation which reflects a tendency of a channel and short-term link adaptation which deals with an instant change in a channel are combined, and a data communication method thereof.

According to an aspect of an exemplary embodiment, a data transmission method includes adjusting a data transmission speed when a number of retransmission of a data transmission unit reaches a predetermined number, wherein data retransmission is performed when a transmission failure occurs; transferring the data transmission unit at the adjusted data transmission speed; readjusting the adjusted data transmission speed to a basic data transmission speed when the data retransmission is successful; and reducing the basic data transmission speed when at least one of a retransmission rate and a number of the transmission failure.

The data transmission method further includes restoring the basic data transmission speed when a predetermined restoration condition is satisfied after the basic transmission speed is reduced.

The restoration condition may be set based on at least one of a predetermined retransmission rate and a predetermined period.

According to an aspect of another exemplary embodiment, a wireless communication apparatus includes a communicator configured to communicate with an external node, a storage configured to store a predetermined speed adjusting condition, and a controller configured to adjust a communication speed for an external node according to a communication state with the external node and the speed adjusting condition, wherein the controller performs data retransmission when a transmission failure occurs, adjusts data transmission speed when a number of retransmission of a data transmission unit reaches a threshold number stored in the storage, transfers the data transmission unit at the adjusted data transmission speed, and readjusts the adjusted data transmission speed to a basic data transmission speed when the data retransmission is successful, and the controller reduces the basic data transmission speed when at least one of a retransmission rate and a number of the transmission failure satisfies a threshold condition stored in the storage.

The controller may restore the basic data transmission speed when a predetermined restoration condition is satisfied after the basic data transmission speed is reduced.

The restoration condition may be set based on at least one of a predetermined retransmission rate and a predetermined period.

According to an aspect of still another exemplary embodiment, a communication system includes a plurality of user terminal devices, and an access point (AP) configured to communicate with at least one of the plurality of user terminal devices and adjust a communication speed according to a communication state of a user terminal device, wherein the AP performs data retransmission when a transmission failure occurs, adjusts a data transmission speed when a number of retransmission of a data transmission unit reaches a predetermined number, transfers the data transmission unit to the user terminal device at the adjusted data transmission speed, and readjusts the adjusted data transmission speed to a basic data transmission speed when the data retransmission is successful, and the AP reduces the basic data transmission speed when at least one of a retransmission rate and a number of the transmission failure satisfies a predetermined threshold condition.

The AP may restore the basic data transmission speed when a predetermined restoration condition is satisfied after the basic data transmission speed is reduced.

The restoration condition may be set based on at least one of a predetermined retransmission rate and a predetermined period.

At least one of the threshold condition and the restoration condition may be set separately for each of the user terminal device.

According to an aspect of still another exemplary embodiment, a non-transitory computer-readable recording medium having embodied thereon at least one program including a command for performing a method of transmitting data includes: adjusting a data transmission speed when a number of retransmission of a data transmission unit reaches a predetermined number, wherein data retransmission is performed when a transmission failure occurs; transferring the data transmission unit at the adjusted data transmission speed; readjusting the adjusted data transmission speed to a basic data transmission speed when the data retransmission is successful; and reducing the basic data transmission speed when at least one of a retransmission rate and a number of the transmission failure satisfies a predetermined threshold condition.

According to an aspect of still another exemplary embodiment, a wireless communication apparatus includes a communicator configured to communicate with an external node; a storage configured to store a basic data transmission speed and at least one preset data transmission speed corresponding to a number of data retransmission; and a controller configured to perform data transmission at the basic data transmission speed, perform data retransmission in response to a transmission failure, and when a number of the data retransmission reaches a threshold number, perform the data retransmission at a preset predetermined speed corresponding to the threshold number.

The at least one preset predetermined speed may include a plurality of preset predetermined speed corresponding to respective threshold numbers of the data retransmission.

When the data retransmission is successful, the controller may perform the data transmission at the basic data transmission speed.

The controller may modify the basic data transmission speed stored in the storage based on at least one of a retransmission rate and a number of the transmission failure.

The controller may restore the modified basic data transmission speed to the basic data transmission speed when the retransmission rate reaches a predetermined level.

The controller may restore the modified basic data transmission speed to the basic data transmission speed when a current transmission period elapses.

Additional and/or other aspects will be set forth in part in the description which follows and, in part, will be obvious from the description, or may be learned by practice.

BRIEF DESCRIPTION OF THE DRAWINGS

The above and/or other aspects will be more apparent by describing certain exemplary embodiments with reference to the accompanying drawings, in which:

FIG. 1 illustrates a data frame format according to an exemplary embodiment;

FIGS. 2 and 3 are conceptual views for explaining a link adaptation method according to an exemplary embodiment;

FIG. 8 is a conceptual view for explaining a link adaptation method of a communication system including a plurality of terminal devices according to an exemplary embodiment.

DETAILED DESCRIPTION OF THE EXEMPLARY EMBODIMENTS

Figure 2:
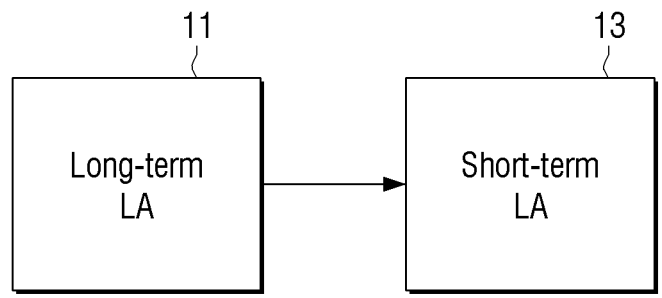

Certain exemplary embodiments will now be described in greater detail with reference to the accompanying drawings.

In the following description, same drawing reference numerals are used for the same elements even in different drawings. The matters defined in the description, such as detailed construction and elements, are provided to assist in a comprehensive understanding of the invention. Thus, it is apparent that the exemplary embodiments can be carried out without those specifically defined matters. Also, well-known functions or constructions are not described in detail since they would obscure the invention with unnecessary detail.

FIG. 1 illustrates a data frame format according to an exemplary embodiment.

In (1) of FIG. 1, a frame format of a media access layer (MAC) protocol data unit (MPDU) is shown. A protocol data unit (PDU) is information unit which is transferred between peer entities of a network. The PDU may include control information, such as address and data. In a layered system, the PDU may be a data unit which is designated in a protocol of a particular layer and includes data enabled in a corresponding layer and protocol control information.

The MPDU is a message exchanged between MAC entities in a communication system based on a layered Open Systems Interconnection (OSI) model. In the system, the MPDU may be larger than a MAC service data unit (MSDU). In this case, the MPDU may include a plurality of MSDUs as a result of packet integration. Alternatively, in the system, the MPDU may be smaller than the MSDU. In this case, the MSDU may generate a plurality of MPDUs as a result of packet distribution.

In an exemplary embodiment, the MPDU may include a MAC header, a variable frame body field, and a frame check sequence (FCS) field. The MAC header may include a frame control field, a duration/ID field, address fields, and a sequence control field. The MAC header and the FCS field may include a total of 28 bytes.

The frame control field may include 2 bytes and include information to identify a protocol version and a type of a frame use. The duration/ID field may include 2 bytes and include network allocation vector (NAV) information, contention free period (CFP) information, and association identification (AID) information. Each address field may include 6 bytes. An 'address 1' field may be used for a receiver. An 'address 2' field may be used for a transmitter. An 'address 3' field may be used for filtering by the receiver. An 'address 4' field may be used for a data frame of a wireless distribution system (WDS) which is distributed from an access point (AP) to another AP. Accordingly, the 'address 4' field may be selectively used.

The sequence control field may include 2 bytes. The sequence control field may be used for defragmentation and disuse of copy frames. The frame body may include transmission data. IEEE 802.11 standards may transfer a frame of a payload of the maximum 2304 bytes. The FCS may include 4 bytes. The FCS may also be referred to as cyclic redundancy check (CRC). The FCS may check integrity of a received frame.

In (2) of FIG. 1, a frame format of an acknowledgement (ACK) frame is shown. The ACK frame may include a MAC header and an FCS field. The MAC header may include a frame control field of 2 bytes, a duration field of 2 bytes, and a receiver address field of 6 bytes. The FCS field may include 4 bytes.

Data may be transferred by adding a physical layer convergence procedure (PLCP) preamble and a PCLP header to an MPDU and thus generating a PLCP protocol data unit (PPDU).

The MPDU described above may be a data unit and be transferred using link adaptation (LA). A method of applying the LA is described below.

FIGS. 2 and 3 are conceptual views for explaining a link adaptation method according to an exemplary embodiment.

In FIG. 2, a long-term LA module 11 and a short-term LA module 13 are shown. A long-term LA is an LA which reflects a tendency of a channel during a predetermined period. For example, the predetermined period may be set based on the number of, for example, thousands of or tens of thousands of MPDUs or be set in a time unit such as, for example, dozens of milliseconds or a few seconds. A short-term LA may be applied to deal with a shorter change in a channel when each MPDU is transferred. Alternatively, the short-term LA may be set in, for example, dozens of or hundreds of microseconds.

In the related art, there are no specific guidelines for a period or a time interval for applying the LA. It is important for the LA to estimate a current channel, determine whether to increase or decrease a transmission speed, and determine a period for applying the LA. An erroneous increase or decrease of the transmission speed by the LA may result in a reduced throughput. According to a 802.11 link type, WLANs normally have a channel characteristic that, in a modulation and coding scheme (MCS) which is higher than an appropriate MCS, a transmission success rate may decrease, and accordingly, a transmission failure may occur and a throughput may decline. In particular, when the transmission speed is erroneously increased or decreased, a transmission failure of the MPDU occurs and a significant decline in throughput occurs according to characteristics of traffic. The MCS indicates operations of the transmission speed defined according to a predetermined standard. In IEEE 802.11n standards, various designs and transmission speeds thereof are defined. Examples of the maximum transmission speed in each transmission mode are shown below.

TABLE 1

| MCS Index | Spatial Streams | Modulation Type | Coding Rate | Data Rate Mb/s | | | |
|---|---|---|---|---|---|---|---|
| | | | | 20 MHz Channel | | 40 MHz Channel | |
| | | | | 800 ns GI | 400 ns GI | 800 ns GI | 400 ns GI |
| 0 | 1 | BPSK | ½ | 6.50 | 7.20 | 13.50 | 15.00 |
| 1 | 1 | QPSK | ½ | 13.00 | 14.40 | 27.00 | 30.00 |
| 2 | 1 | QPSK | ¾ | 19.50 | 21.70 | 40.50 | 45.00 |
| 3 | 1 | 16-QAM | ½ | 26.00 | 28.90 | 54.00 | 60.00 |
| 4 | 1 | 16-QAM | ¾ | 39.00 | 43.30 | 81.00 | 90.00 |
| . . . | | | | | | | |
| 31 | 4 | 64-QAM | ⅚ | 260.00 | 288.90 | 540.00 | 600.00 |

For example, in a transmission control protocol (TCP) traffic, when successive transmission failures occur, a congestion control mechanism operates so that a size of a transmission window is reduced. Thus, although the channel is in a sufficiently good condition, a throughput of the channel may decline. In addition, since wireless communications require high performance with a low central processing unit (CPU) clock and a low bus clock due to requirements of a system on chip (SoC) for low power consumption, the short-term LA needs an additional algorithm for performing a process for the LA, which is disadvantageous.

Therefore, with respect to a period for applying the LA, the long-term LA module 11 for dealing with a long-term channel change and the short-term LA module 13 for dealing with a short-term channel change are separately provided. In other words, in an exemplary embodiment, a combination of the long-term LA module 11 and the short-term LA module 13 is implemented. The long-term LA module 11 and the short-term LA module 13 may be implemented in hardware or software or a combination thereof. In an exemplary embodiment, the long-term LA module 11 is implemented in software, and the short-term LA module 13 is implemented in hardware. The reason why the long-term LA module 11 is implemented in software is because, in an LA module which is implemented in software, an operating period is longer due to a computing operation of a CPU, which is advantageous in terms of reflecting resources and tendency.

The long-term LA module 11 is used to reflect a tendency of a channel but may not deal with an instant change. Accordingly, the short-term LA module 13 capable of dealing with an instant change in a channel is separately provided. Since the short-term LA module 13 implemented in hardware performs a designated operation in hardware and not in software, the short-term LA module 13 does not require the computing power of the CPU. Accordingly, delay in processing caused by software does not occur. For example, in an SoC system having a low clock, when tens of thousands of MPDUs are processed per second, a delay of processing such as context switching and bus arbitrating may occur when the short-term LA is implemented in software and an operation is performed using a software code for the short-term LA 13. Therefore, the short-term LA module 13 may be implemented in hardware to effectively deal with a channel change, save resources, and improve throughput.

By combining the long-term LA module 11 which is implemented in software and the short-term LA module 13 which is implemented in hardware, effective performance may be achieved with limited sources.

FIG. 3 illustrates a conceptual view for explaining the LA performed by a combination of the long-term LA module 11 and the short-term LA module 13 according to an exemplary embodiment. As described with reference to FIG. 2, the MCS and the transmission speed may not be the same. However, for illustrative purposes, it is assumed that the MCS is the same concept as the transmission speed. First, methods for determining an MCS of the long-term LA and the short-term LA are described.

The MCS of the long-term LA may be determined using a retransmission rate or the number of transmission failures. That is, at least one of a predetermined retransmission rate and a predetermined number of transmission failures may be used to set a threshold condition for controlling the MCS. For example, a first threshold condition may be set to a retransmission rate of 20%, and a second threshold condition may be set to a retransmission rate of 30%. In this case, when the retransmission rate first reaches 20% in a predetermined long-term applying period, the long-term LA module 11 decreases the MCS to a first predetermined level. When the retransmission rate is increased to reach 30% in the same long-term applying period, the long-term LA module 11 additionally decreases the MCS to a second predetermined level.

Also, the threshold condition may be set based on both the retransmission rate and the number of transmission failures. For example, a threshold condition may be set to a retransmission rate of 10% and the number of transmission failures to three. In this case, when the retransmission rate of 10% and the three transmission failures are all satisfied, the long-term LA module 11 decreases the MCS. Alternatively, the threshold condition may be set to one of the retransmission rate or the number of transmission failures.

In addition, the long-term LA module 11 increases the data transmission speed when a predetermined restoration condition is satisfied. The restoration condition may be set based on at least one of a predetermined retransmission rate and a predetermined period. For example, a first restoration condition may be set to a retransmission rate of 25%, and a second restoration condition may be set to a retransmission rate of 15%. In this case, in a state that the retransmission rate is higher than 30%, when data transmission is continuously successful and thus the retransmission rate reduces to 25%, the wireless communication apparatus may increase the MCS to a predetermined level. Subsequently, when a current period is finished and a next period starts, the wireless communication apparatus restores the MCS to have an initially set basic data transmission speed and performs data transmission for the next period.

The MCS of the short-term LA may be determined using the number of retransmissions of an MPDU. For example, a level 1 of the short-term LA may be set when the number of retransmissions reaches 1, and a level 2 of the short-term LA may be set when the number of retransmission reaches 5. Similar to the MCS determination method of the long-term LA, the MCS of the short-term LA may be set to a predetermined level when a corresponding level condition is satisfied. However, when transmission of a single MPDU is successful, the short-term LA may be restored to the original MCS and thus a subsequent MPDU is transmitted. For example, when the number of retransmissions of an MPDU reaches 3, the short-term LA module 13 may decrease its level to be lower than the basic MCS level and retry transmission. When the transmission is successful, the short-term LA module 13 may restore its level to the basic MCS and transmit a subsequent MPDU.

In FIG. 3, a table shows a combination of the long-term LA and the short-term LA. Referring to the table of FIG. 3, the long-term LA module 11 is set to an MCS 12. When the number of retransmissions is 0, the short-term LA module 13 is set to the level 1 of the short-term LA, e.g., MCS 12 and the wireless communication apparatus transmits an MPDU. When the number of retransmissions of a first MPDU reaches 3, the short-term LA module 13 is set to the level 2 of the short-term LA, e.g., MCS 11 and the wireless communication apparatus transmits a second MPDU. When the second MPDU is successfully transmitted, the short-term LA module 13 restores the transmission speed to MCS 12 which is the basic transmission speed set in the long-term LA module 11. When the number of retransmissions of a third MPDU reaches 3, the short-term LA module 13 is set to the level 2 of the short-term LA, e.g., MCS 11. When transmission of the third MPDU successively fails and thus the number of retransmissions reaches 5, the short-term LA module 13 is set to the level 3 of the short-term LA, e.g., MCS 10. Subsequently, when transmission of the third MPDU is successful, the short-term LA module 13 restores the transmission speed to the basic transmission speed, e.g., MCS 12.

The link adaptation which transmits data by using a combination of the long-term LA and the short-term LA is described below in detail with reference to FIG. 4.

Figure 4:
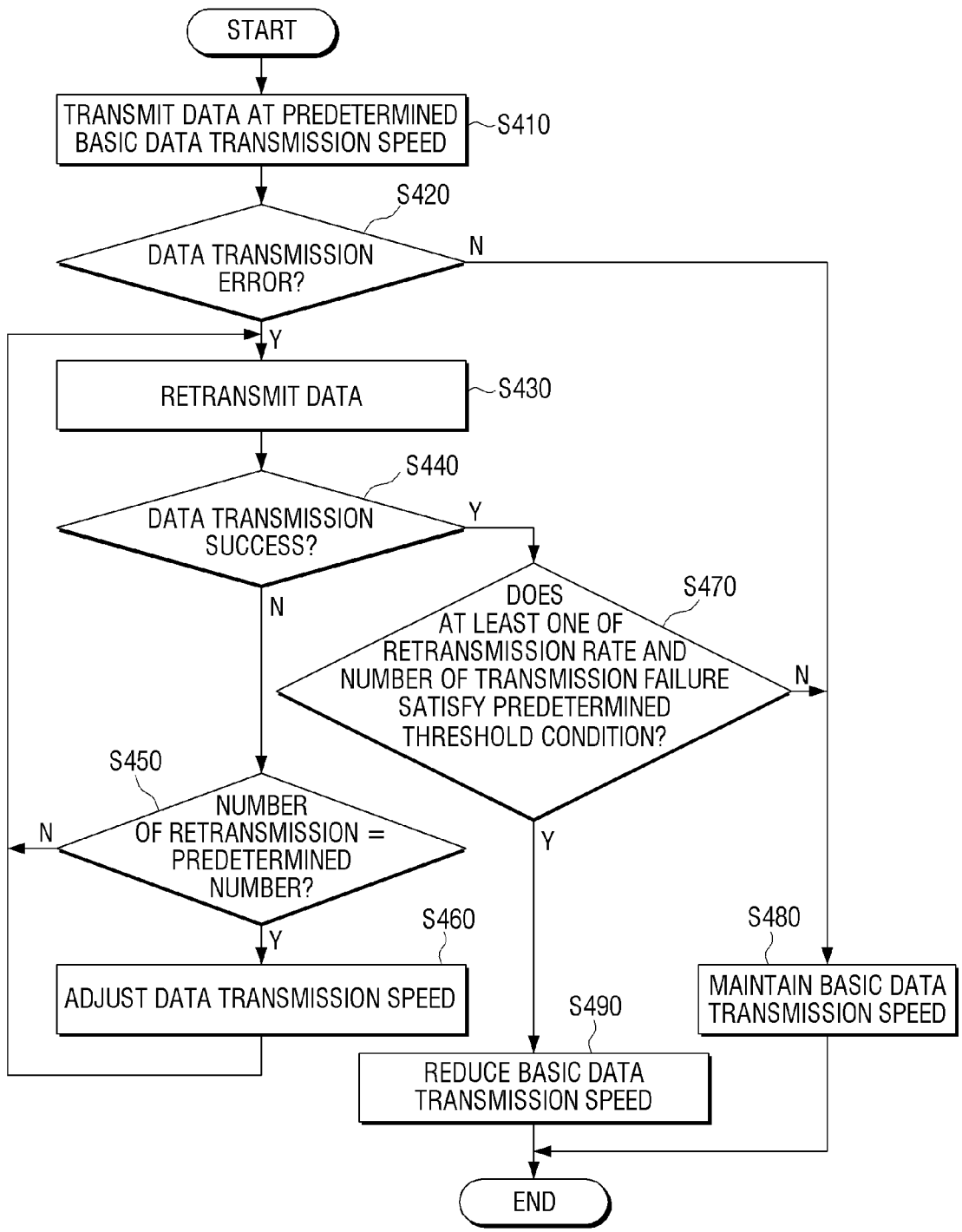
FIG. 4 is a flow chart illustrating a data transmission method according to an exemplary embodiment.

FIG. 4 is a flow chart of a data transmission method according to an exemplary embodiment.

With reference to FIG. 4, in operation S410, the wireless communication apparatus transfers data at a predetermined data transmission speed. The predetermined data transmission speed may be represented in a predetermined MCS index. The data may be transferred by the MPDU. In operation S420, the wireless communication apparatus determines whether a data transmission error occurs. It may be determined whether the data transmission error occurs by using an ACK frame which is transferred from the receiver. For example, when the wireless communication apparatus does not receive any ACK frame from the receiver or when a received ACK frame is abnormal, the wireless communication apparatus determines that a transmission error occurs. In operation S480, when a data transmission error does not occur in operation S420, the wireless communication apparatus maintains the basic data transmission speed.

In operation S430, when the data transmission error occurs in operation S420, the wireless communication apparatus performs retransmission. In operation S440, the wireless communication apparatus determines whether the retransmission is successful. In operation S450, when the retransmission fails, the short-term LA module 13 determines whether the number of the performed retransmissions reaches a predetermined number. When the number of the performed retransmissions does not reach the predetermined number, the short-term LA module 13 repeats operation 430 while maintaining the current data transmission speed. In operation S460, when the number of the performed retransmissions reaches the predetermined number, the short-term LA module 13 adjusts the data transmission speed to a predetermined data transmission speed corresponding to the predetermined number of retransmissions. Next, the wireless communication apparatus repeats operation 430 to perform retransmission at the adjusted data transmission speed.

In operation S470, when the data transmission is successful, the long-term LA module 11 determines whether at least one of the retransmission rate and the number of transmission failures satisfies a preset threshold condition. In operation S480, when the threshold condition is not satisfied, the long-term LA module 11 maintains the basic data transmission speed. In operation S490, when the threshold condition is satisfied, the long-term LA module 11 reduces the basic data transmission speed. An exemplary embodiment illustrated in FIG. 4 is described with respect to a single transmission period. When the predetermined single transmission period elapses, the long-term LA module 11 restores the data transmission speed to the basic data transmission speed and the wireless communication apparatus starts data transmission again.

A configuration of a wireless communication apparatus according to an exemplary embodiment is described below.

Figure 5:
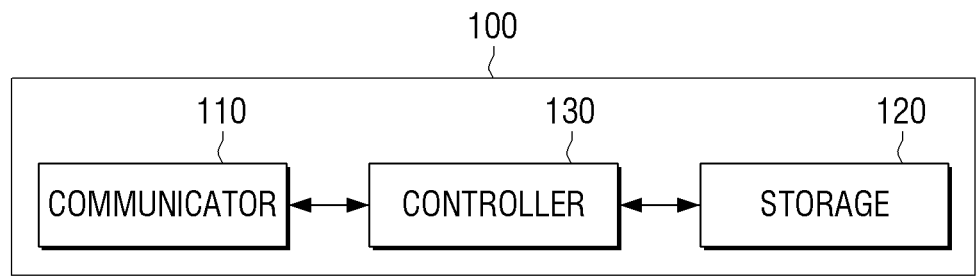
FIG. 5 is a block diagram illustrating a configuration of a wireless communication apparatus according to an exemplary embodiment.

FIG. 5 is a block diagram of a configuration of a wireless communication apparatus according to an exemplary embodiment.

With reference to FIG. 5, a wireless communication apparatus 100 may include a communicator 110, a storage 120, and a controller 130. The wireless communication apparatus as shown in FIG. 5 may perform the link adaption process described above by using a combination of the long-term LA and the short-term LA. In an exemplary embodiment, the storage 120 may be a memory and the controller 130 may be a central processing unit (CPU).

The communicator 110 communicates with an external node. That is, the communicator 110 transfers wireless data generated by the controller 130 and receives wireless data from other wireless communication apparatuses. The communicator 110 transfers or receives wireless signals in a broadcast or unicast method.

The storage 120 stores a predetermined speed adjusting condition. In addition, the storage 120 may store a control program to control the wireless communication apparatus 100 or the controller 130. For example, the storage 120 may include a read-only memory (ROM), a random access memory (RAM), and a memory card (e.g. a secure digital (SD) card and a memory stick) which is detachable from the wireless communication apparatus 100. In addition, the storage 120 may include a non-volatile memory, a volatile memory, a hard disk drive (HDD), and a solid state drive (SDD).

The controller 130 may adjust a communication speed for the external node according to a communication state at the external node and the speed adjusting condition. The controller 130 may include the long-term LA module and the short-term LA module. The long-term LA module and the short-term LA module may be implemented in hardware or software. In an exemplary embodiment, the long-term LA module may be implemented in software and the short-term LA module may be implemented in hardware.

The controller 130 transfers data at predetermined basic data transmission speed. When the number of retransmission of a single data transmission unit reaches a threshold condition, the controller 130 adjusts the data transmission speed. Next, the controller 130 transfers the data transmission unit at the adjusted data transmission speed, and when data transmission is successful, the controller 130 readjusts the data transmission speed to the basic data transmission speed.

In addition, when at least one of a retransmission rate and the number of transmission failures which are measured while transferring data satisfies a threshold condition, the controller 130 may reduce the basic data transmission speed. The wireless communication device 100 may preset a retransmission rate or a predetermined period as a restoration condition so that when the restoration condition is satisfied, the controller 130 may adjust the basic data transmission speed.

In the above-described exemplary embodiments, it is assumed that a single wireless communication apparatus 100 transfers data to a single terminal device. However, in an alternative embodiment, the wireless communication apparatus 100 may transfer data to a plurality of terminal devices. In this case, a transmission condition may be individually set for each terminal device. An exemplary embodiment of transferring data to a plurality of terminal devices is described below.

Figure 6:
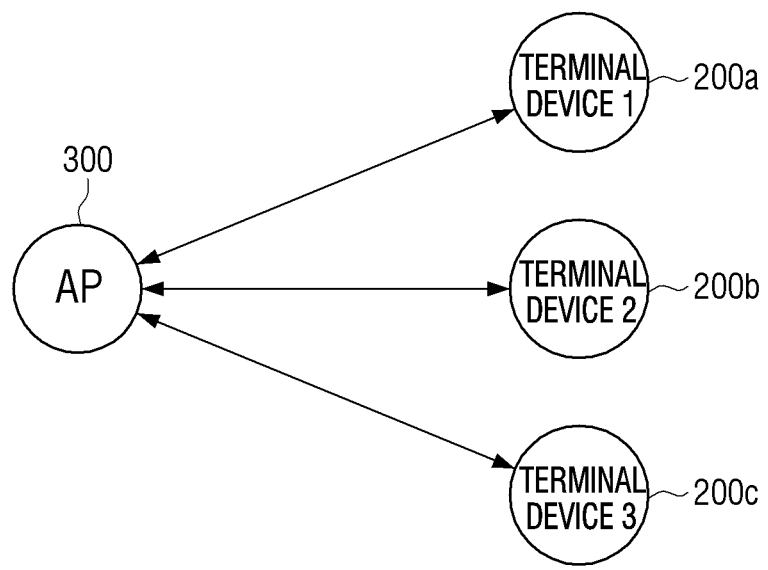
FIG. 6 illustrates a communication system including a plurality of terminal devices according to an exemplary embodiment.

FIG. 6 illustrates a communication system including a plurality of terminal devices according to an exemplary embodiment.

In FIG. 6, a single AP 300 and a plurality of terminal devices 200A, 200B and 200C are shown.

The LA of the AP 300 for data transmission to the terminal devices 200A, 200B and 200C may be performed separately for each terminal device. In the IEEE 802.11, a basic unit of a service providing object has an association ID (AID). That is, the terminal devices 200A, 200B and 200C are individually given a corresponding AID in a basic service set (BSS), and receive a data service from the AP 300. Since each terminal device 200A, 200B and 200C physically exists in different locations of the AP 300, a different channel response is received according to a wireless channel or a terminal device. For example, a path loss by a difference in distance or a difference in quality of received signals due to obstacles may occur. When applying the LA, LA parameters may be separately managed based on the AID so that a transmission rate suitable for a channel environment of each terminal device 200A, 200B and 200C may be selected.

In the AP 300, each terminal device 200A, 200B and 200C has a separate ID. Accordingly, data to transfer to each terminal device 200A, 200B and 200C may be distinguished using AID information of the duration/ID field of the MPDU frame format described with reference to FIG. 1. In addition, the AP 300 may manage the retransmission rate, the number of transmission failures, the number of retransmissions, MCS, etc., according to the AID corresponding to each terminal device 200A, 200B and 200C. Thus, the LA may be performed for each terminal device 200A, 200B and 200C.

A method for transferring data from the single AP 300 to the plurality of terminal devices 200A, 200B and 200C using a link adaptation method by using a combination of the long-term LA and the short-term LA is described below.

Figure 7:
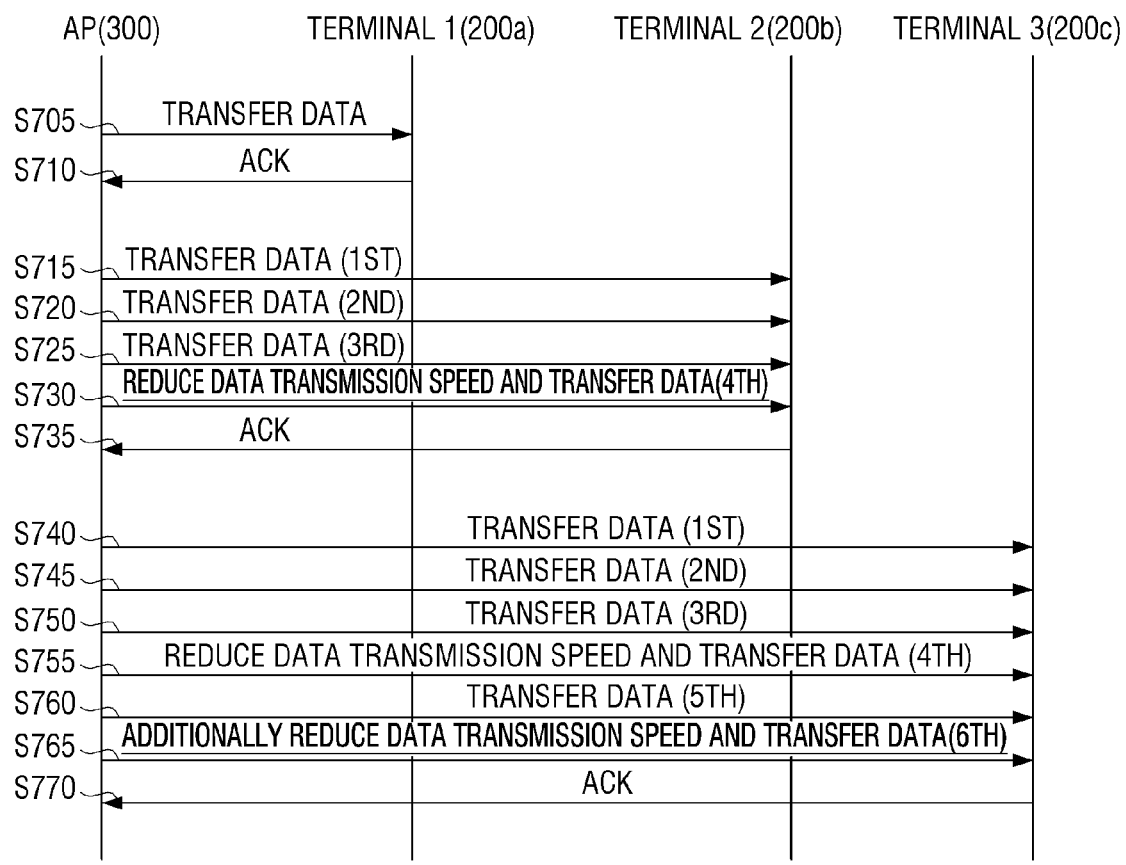
FIG. 7 illustrates a signal flow in a communication system which adopts a link adaptation method according to an exemplary embodiment.

FIG. 7 illustrates a signal flow in a communication system which adopts a link adaptation method according to an exemplary embodiment.

With reference to FIG. 7, the single AP 300 separately transfers data to first, second, and third terminal devices 200A, 200B, and 200C. In operation S705, the AP 300 transfers data to the first terminal device 200A. Here, the AP 300 transfers the data to the first terminal device 200A at the basic transmission speed. In operation S710, the first terminal device 200A receives the data and transfers an ACK signal to the AP 300. When the received ACK signal is normal, the AP 300 determines that data transmission is successful.

In operation S715, the AP 300 transfers the data to the terminal device 2 200B. When the AP 300 does not receive any ACK signal from the terminal device 2 200B or receives a false ACK signal, the AP 300 determines that data transmission fails. In operation S720, the AP 300 retransmits the same data to the terminal 2 200B, and in operation S725, when it is determined that second data transmission is not successful, the AP 300 retransmits the data again to the terminal 2 200B. A threshold condition which is set for the terminal device 2 200B in the AP 300 is the number of retransmission of three. In operation S730, since the threshold condition is satisfied, the AP 300 reduces the data transmission speed and transfers the data again. In operation S735, when the AP 300 receives a normal ACK signal from the terminal device 2 200B, the AP 300 determines that data transmission is successful. When the AP 300 transfers a subsequent data transmission unit, the AP 300 restores the transmission speed to the basic data transmission speed which is set for the terminal device 2 200B and performs data transmission.

In operation S740, the AP 300 transfers the data to the terminal device 3 200C. The first threshold condition which is set for the terminal device 3 200C in the AP 300 is whether the number of retransmissions is three, and the second threshold condition is whether the number of retransmissions is five. When the AP 300 does not receive any ACK signal from the terminal device 3 200C or receives a false ACK signal, the AP 300 determines that data transmission fails. Accordingly, in operations S745 and S750, the AP 300 repeatedly retransmits the data to the terminal device 3 200C. In operation S755, the first threshold condition which is set for the terminal device 3 200C is satisfied, i.e., the retransmission is performed three times, and the AP 300 reduces the data transmission speed and transfers the data. In operation S760, since the AP 300 does not receive a normal ACK signal from the terminal device 3 200C, the AP 300 retransmits the data. In operation S765, the second threshold condition which is set for the terminal device 3 200C is satisfied, i.e., the retransmission is performed five times, and the AP 300 additionally reduces the data transmission speed and transfers the data. In operation S770, when the AP 300 receives a normal ACK signal from the terminal device 3 200C, the AP 300 determines that data transmission is successful.

FIG. 8 is a conceptual view for explaining a link adaptation method of a communication system including a plurality of terminal devices according to an exemplary embodiment.

In FIG. 8, the table shows a combination of the long-term LA and the short-term LA corresponding to each of a plurality of terminal devices. The AID indicates each terminal device. Since the combination of the long-term LA and the short-term LA and the link adaptation method using the same have been described above with reference to FIG. 3, a detailed description thereof is omitted.

However, in FIG. 8, a basic MCS, a retransmission rate and the number of transmission failures which are parameters to determine an MCS in the long-term LA, and an MCS corresponding to the retransmission rate and the number of transmission failures may be set separately for each terminal device. In addition, the number of retransmissions which is a parameter to determine an MCS in the short-term LA and an MCS corresponding to the number of retransmission may be set separately for each terminal device. The AP may store AIDs of a plurality of the terminal devices and parameters for the LA in the storage.

The AP performs link adaptation by using a combination of the long-term LA and the short-term LA so that efficient data transmission may be performed with limited resources for each terminal device. The link adaptation method according to an exemplary embodiment is described below with respect to the long-term LA and the short-term LA.

Figure 9:
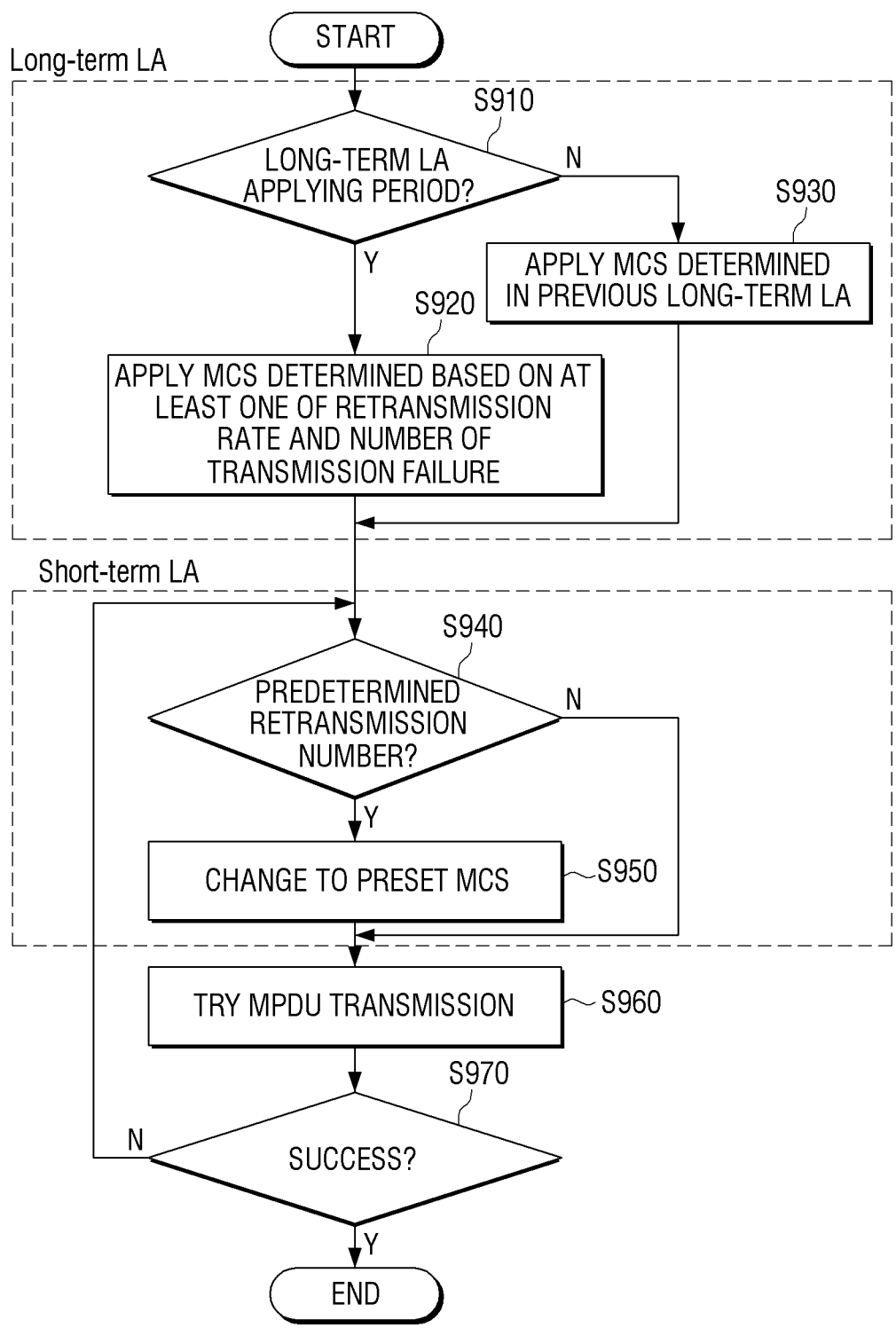
FIG. 9 is a flow chart illustrating a link adaptation method according to an exemplary embodiment.

FIG. 9 is a flow chart of a link adaptation method according to an exemplary embodiment.

With reference to FIG. 9, in operation S910, the wireless communication apparatus determines whether a period for applying the long-term LA arrives, in a long-term LA operation. In an alternative embodiment, the wireless communication apparatus may always perform the long-term LA without determining whether a period for applying the long-term LA arrives. Further, the wireless communication apparatus may only determine whether a single period for applying the LA is finished.

In operation S920, when the wireless communication apparatus determines that a period for applying the long-term LA arrives, the wireless communication apparatus determines the MCS based on at least one of a retransmission rate and the number of transmission failures. In operation S930, when the wireless communication apparatus determines that a period for applying the long-term LA arrives, the wireless communication apparatus applies an MCS which is determined in a previous long-term LA. When the wireless communication apparatus transfers an MPDU individually to a plurality of terminal devices, the wireless communication apparatus may set parameters separately for each terminal device. In addition, when a predetermined restoration condition is satisfied, the wireless communication apparatus may adjust the MCS.

In operation S940, the wireless communication apparatus determines whether the predetermined number of retransmissions is reached, in a short-term LA operation. When the wireless communication apparatus transfers an MPDU individually to the plurality of terminal devices, the wireless communication apparatus may set parameters separately for each terminal device.

In operation S960, when the wireless communication apparatus determines that the predetermined number of retransmissions is not reached, the wireless communication apparatus performs transmission of the MPDU in a current MCS. In operation S950, when the wireless communication apparatus determines that the predetermined number of retransmissions is reached, the wireless communication apparatus changes to an MCS which is preset corresponding to the predetermined number of retransmissions. In operation S960, when the wireless communication apparatus changes to the corresponding MCS, the wireless communication apparatus performs transmission of the MPDU in the changed MCS. When the transmission of the MPDU is successful, the wireless communication apparatus changes to the basic MCS and performs transmission of a next MPDU.

In operation S970, when the transmission of the MPDU fails, the wireless communication apparatus determines again whether the number of retransmissions reaches the predetermined number of retransmissions. As described above, the wireless communication apparatus performs link adaptation by using a combination of the long-term LA and the short-term LA so that improved, e.g., optimized, data transmission throughput can be obtained.

The aforementioned data transmission methods according to various exemplary embodiments may be implemented in a program and thus be provided to wireless communication devices.

For example, a program including commands for adjusting a data transmission speed when a number of retransmission of data transmission unit reaches a predetermined number, wherein the retransmission is performed when data transmission fails, transferring the data transmission unit at the adjusted data transmission speed, readjusting the adjusted data transmission speed to a basic data transmission speed when the data transmission is successful, and reducing the basic data transmission speed when at least one of a retransmission rate and a number of transmission failures satisfies a predetermined threshold condition may be stored in a non-transitory computer readable medium.

The non-transitory computer readable medium is a medium which does not store data temporarily such as a register, cash, and a memory but stores data semi-permanently and is readable by a device. More specifically, the aforementioned various applications or programs may be stored and provided in a non-transitory computer readable medium such as a compact disk (CD), a digital video disk (DVD), a hard disk, a Blu-ray disk, a universal serial bus (USB), a memory card, and a read-only memory (ROM).

As described above, the wireless communication device according to various exemplary embodiments may perform efficient and proper data transmission, while being capable of dealing with a tendency of a channel during a predetermined period and an instant change in the channel.

The foregoing exemplary embodiments and advantages are merely exemplary and are not to be construed as limiting the present disclosure. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A data transmission method comprising:
    transmitting data by a transmission unit at a transmission speed;
    retransmitting the transmission unit at the transmission speed if transmission of the transmission unit is failed;
    first adjusting the transmission speed based on a number of retransmission of the transmission unit during a first predetermined period and restoring the first adjusted transmission speed to the transmission speed if retransmission of the transmission unit is successful at the first adjusted transmission speed; and
    second adjusting the transmission speed based on at least one of a number of retransmission of transmission units and a number of transmission units of which transmission is abandoned during a second predetermined period,
    wherein the second predetermined period is longer than the first predetermined period.

2. The data transmission method as claimed in claim 1, wherein the transmission unit is MAC Protocol Data Unit (MPDU).

3. The data transmission method as claimed in claim 1, wherein the second adjusting comprises reducing the transmission speed if the number of retransmission of transmission units satisfies a first threshold condition, and further reducing the transmission speed if the number of retransmission of transmission units satisfies a second threshold condition.

4. The data transmission method as claimed in claim 1, wherein the second adjusting comprises adjusting the transmission speed if the number of retransmission of transmission units satisfies the threshold condition and the number of transmission units of which the transmission is abandoned satisfies a predetermined number.

5. The data transmission method as claimed in claim 1, further comprising:
    after the transmission speed is second adjusted, recovering the second adjusted speed to the transmission speed if the number of retransmission of transmission units satisfies a threshold condition or a predetermined period arrives.

6. A wireless communication apparatus comprising:
    a communicator configured to communicate with an external node; and
    a processor configured to:
        control the communicator to transmit data by a transmission unit at a transmission speed,
        control the communicator to retransmit the transmission unit at the transmission speed if transmission of the transmission unit is failed,
        control the communicator to adjust the transmission speed based on a number of retransmission of the transmission unit during a first predetermined period and restore the adjusted transmission speed to the transmission speed if retransmission of the transmission unit is successful at the first adjusted transmission speed, and
        control the communicator to adjust the transmission speed based on at least one of a number of retransmission of transmission units and a number of transmission units of which transmission is abandoned during a second predetermined period,
    wherein the second predetermined period is longer than the first predetermined period.

7. The wireless communication apparatus as claimed in claim 6, wherein the transmission unit is MAC Protocol Data Unit (MPDU).

8. The wireless communication apparatus as claimed in claim 6, wherein the processor controls the communicator to reduce the transmission speed if the number of retransmission of transmission units satisfies a first threshold condition, and to reduce the transmission speed if the number of retransmission of transmission units satisfies a second threshold condition.

9. The wireless communication apparatus as claimed in claim 6, wherein the processor controls the communicator to adjust the transmission speed if the number of retransmission of transmission units satisfies the threshold condition and the number of transmission units of which the transmission is abandoned satisfies a predetermined number.

10. The wireless communication apparatus as claimed in claim 6, wherein, after the transmission speed is second adjusted, the processor controls the communicator to recover the adjusted speed to the transmission speed if the number of retransmission of transmission units satisfies a threshold condition or a predetermined period arrives.

* * * * *